United States Patent
Sanchez Gonzalez et al.

(10) Patent No.: US 9,647,445 B2
(45) Date of Patent: May 9, 2017

(54) OVER-CURRENT PROTECTION CIRCUIT AND METHOD

(71) Applicant: Continental Automotive Systems, Inc., Auburn Hills, MI (US)

(72) Inventors: Izcoatl Emanuel Sanchez Gonzalez, Guadalajara (MX); Mario Alejandro Rodriguez Rodriguez, Tlaquepaque (MX); Yessica Fabiola Chavez Sanchez, Tlaquepaque (MX)

(73) Assignee: Continental Automotive Systems, Inc., Auburn Hills, MI (US)

(*) Notice: Subject to any disclaimer, the term of this patent is extended or adjusted under 35 U.S.C. 154(b) by 0 days.

(21) Appl. No.: 14/489,247

(22) Filed: Sep. 17, 2014

(65) Prior Publication Data
US 2016/0079748 A1 Mar. 17, 2016

(51) Int. Cl.
H02H 3/087 (2006.01)
H02H 3/093 (2006.01)
H02H 7/20 (2006.01)

(52) U.S. Cl.
CPC ............ H02H 3/087 (2013.01); H02H 3/093 (2013.01); H02H 7/20 (2013.01)

(58) Field of Classification Search
CPC .......... H02H 3/08; H02H 3/087; H02H 3/093; H02H 3/06
See application file for complete search history.

(56) References Cited

U.S. PATENT DOCUMENTS

| 4,600,963 A * | 7/1986 | Hertrich ........... H03K 17/08144 361/101 |
| 5,262,676 A * | 11/1993 | Blumel .................... H02H 3/04 307/10.1 |
| 2007/0069704 A1 | 3/2007 | Gotzenberger |
| 2013/0332750 A1 * | 12/2013 | Souma .................... H02H 3/08 713/300 |

OTHER PUBLICATIONS

/ C J C 1 Dffice Action with English translation from the Korean Intellectual Property Office dated Jan. 6, 2017 for the ,mrresponding Korean Patent Application no. Oct. 2015-0131782.

* cited by examiner

*Primary Examiner* — Stephen W Jackson
*Assistant Examiner* — Christopher Clark

(57) ABSTRACT

A determination is made as to when the current flowing through a transistor exceeds a predetermined threshold. When the current exceeds the predetermined threshold, the transistor is deactivated. The deactivating of the transistor is effective to limit the current that flows through the transistor. The limiting of the current is effective to prevent damage to the transistor in an over current condition. The transistor is maintained in a deactivated state until a time off circuit resets the DC-DC converter circuit. The maintaining of the transistor in the deactivated state until a time off circuit resets the DC-DC converter circuit is additionally effective to reduce the time on (Duty Cycle—D.C.) and frequency to further prevent damage to the transistor due to switching power losses.

14 Claims, 3 Drawing Sheets

OVER-CURRENT PROTECTION CIRCUIT AND METHOD

TECHNICAL FIELD

This application relates to DC-DC converters and, more specifically, for protection circuits for transistors in DC-DC converters.

BACKGROUND OF THE INVENTION

Batteries (and sometimes multiple batteries) are used to power various types of systems. Some examples of battery usage are when batteries are used to power the electrical system of a conventional internal combustion vehicles, the motor of electric vehicles or hybrid electric vehicles. The batteries in these systems can be packs of batteries that provide voltages in the 12-400 volts range.

Accessories and other components (e.g., fuel injectors) that are used in the same vehicles typically require voltages that are different than 200-400 volts. These voltages are typically provided from a 12V battery or a battery array of 24V. One such conversion system that can be used is a DC-DC converter. In some examples of DC-DC converters, the voltage may be converted from 12 volts to 48 volts (for example, to drive fuel injectors). Other examples of conversions are possible.

Although DC-DC converters have been used, they have operational issues and limitations. For instance, the conversion circuitry in the DC-DC converter typically utilizes transistors. Transistors can be damaged or destroyed when too high a current is applied. For example, in certain applications that use inductors, the inductors can become defective introducing high currents into the transistors that drive the circuits. In other examples, overloads at the output or glitches in the control logic of the circuit can result in too much current flowing through transistors, possibly leading to the destruction of these transistors.

Previous approaches have not been entirely successful in solving the above-mentioned problems. This has resulted in some user dissatisfaction with these previous systems and approaches.

BRIEF DESCRIPTION OF THE DRAWINGS

For a better understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are described herein that halt the operation of any one or more channels of a high voltage DC-DC converter at a time when the current of more than a predetermined threshold is reached. In particular, a driver transistor that is used by any of the channels is deactivated so that the transistor may not be harmed by an over-current condition. The transistor remains off for the entirety of a fixed time out assuring that the transistor survives the over-current condition.

In many of these embodiments, a determination is made as to when the current flowing through the main transistor exceeds a predetermined threshold. When the current exceeds the predetermined threshold, the transistor is deactivated. The deactivation of the transistor is effective to limit the current that flows through the main switch and significantly reduce its power dissipation. The limiting of the current is effective to prevent damage to the transistor in an over current condition. The transistor is maintained in a deactivated state until a time out circuit resets the DC-DC converter. The maintaining of the transistor in the deactivated state is additionally effective to significantly reduce the duty cycle (time on) and frequency of operation of the main switch and thus reduce its power dissipation.

In yet other aspects, the over current condition could be caused by a defective inductor in the DC-DC converter circuit. One way to detect this over current condition is by comparing a reference voltage against a voltage proportional to the current flowing through the transistor. This comparison is made using an electronic circuitry arranged as a comparator. The output of the comparator is used to reset the channel memory latch and deactivate the main switch. The output of the latch could also be used as a fault condition indication to a microcontroller.

In some aspects, the DC-DC converter drives a device on the vehicle. In some examples, the device is a fuel injection apparatus. Other examples of devices are possible.

Figure 1:
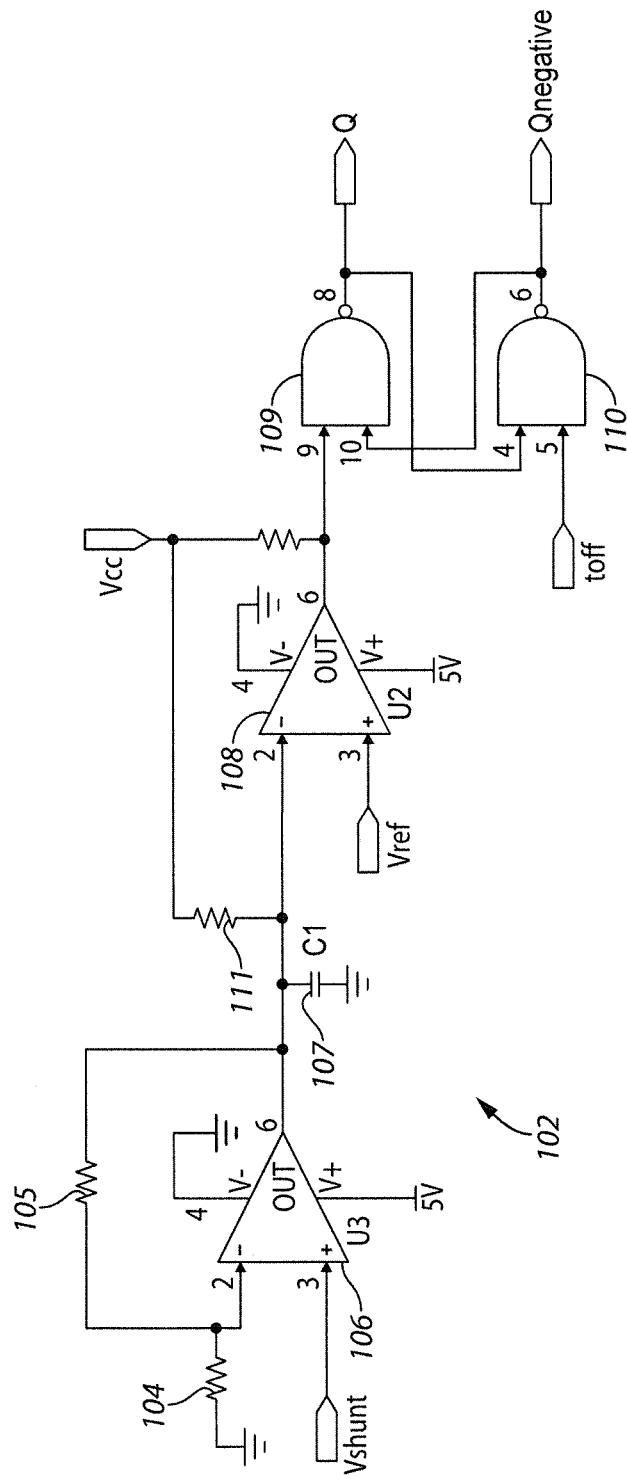
FIG. 1 comprises a circuit diagram of a protection circuit according to various embodiments of the present invention.
Figure 2:
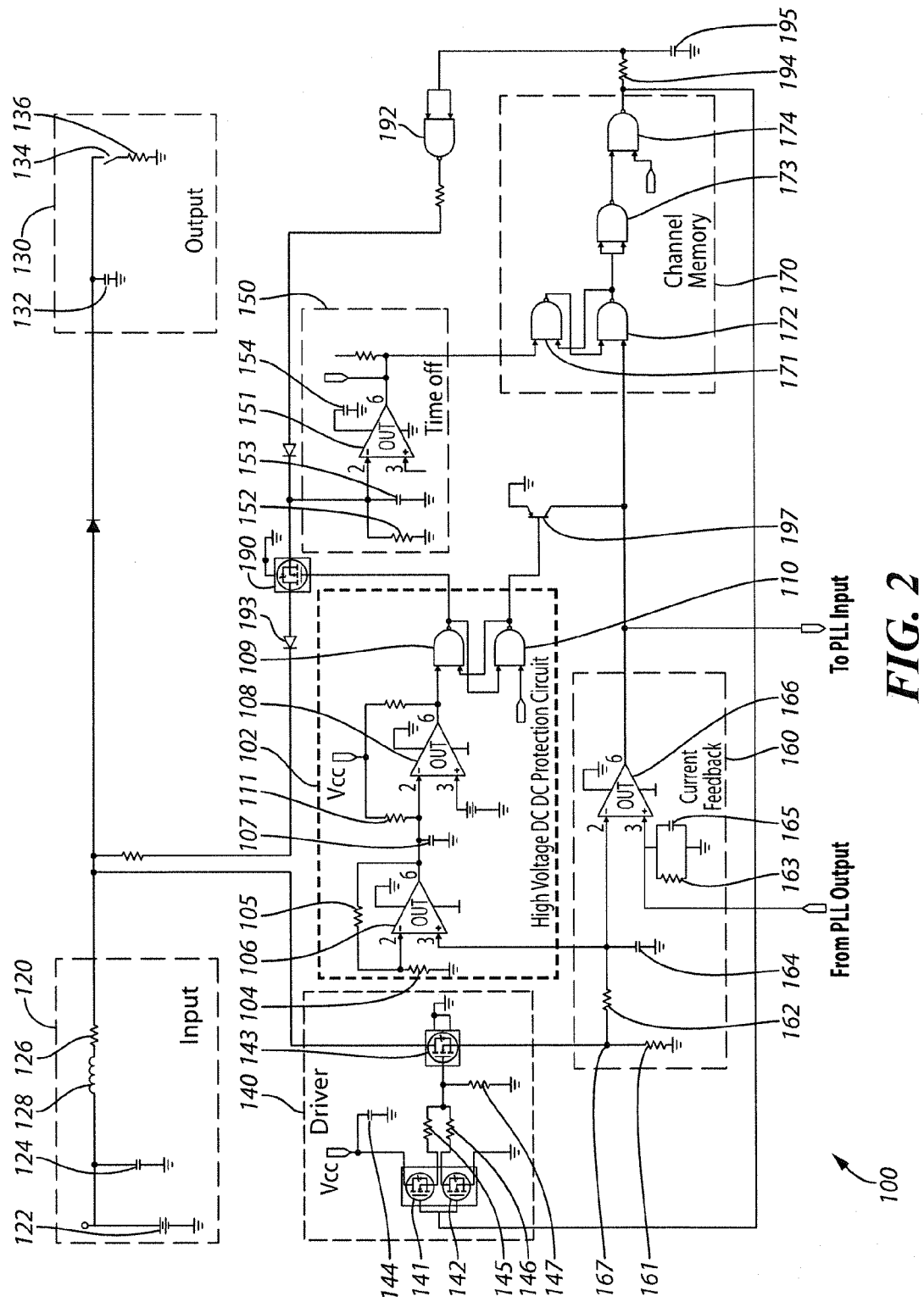
FIG. 2 comprises a circuit diagram of a system that utilizes the protection circuit of FIG. 1 according to various embodiments of the present invention.

Referring now to FIG. 1 and FIG. 2, one example of a protection circuit 102 disposed within a DC-DC converter 100 is described. The protection circuit 102 includes a first resistor 104 (R1999), a second resistor 105 (R2000) an operational amplifier 106 (U3) a first capacitor (C1) 107, a third resistor 111 (2001) a second operational amplifier (U2) 108, a first NAND gate 109, and a second NAND gate 110. The NAND gates 109 and 110 are arranged as a latch.

The DC-DC converter 100 has an input circuit 120, an output circuit 130, a driver circuit 140, a time off circuit 150, a current feedback circuit 160, a channel memory 170, a transistor 190, a NAND gate 192, a bi-polar transistor 93, a resistor 194, and a capacitor 195.

The input circuit 120 includes a battery 122, a capacitor 124, a resistor 126, and an inductor 128. The output circuit 130 includes a capacitor 132, a switch 134, and a load 136. The load 136 may be a vehicle accessory in one example. In another example, the load may be a fuel injector. Other examples are possible.

The driver circuit 140 includes a first transistor 141, a second transistor 142, and a third transistor 143, a capacitor 144, and resistors 145, 146, and 147. The time off circuit 150 includes an operational amplifier 151, a resistor 152, and capacitors 153 and 154.

The current feedback circuit 160 includes resistors 161, 162, and 163, and capacitors 164 and 165, and an operational amplifier 166. The channel memory 170 includes NAND gates 171, 172, 173, and 174.

The transistor 190 is connected as an inverter and coupled to the NAND gate 192, the protection circuit 102, the input circuit 120, and the output circuit 180.

In some aspects of the operation of the circuits of FIG. 1 and FIG. 2, the battery 122 produces a voltage and current. The current flows through and is stored in the inductor 128. Current from the inductor 128 goes to the driver circuit 140 when the transistor 143 is closed, this current flows to the shunt resistor 161 creating a voltage at the node 167 in the current feedback circuit 160. When this voltage exceeds a predetermined value, the output of the operational amplifier 166 in the current feedback circuit 160 change to a logical low value.

The low value at the output of the operational amplifier 166 resets the latch in the channel memory 170. In particular, the output of NAND gate 172 changes to high logical level, the output of the next NAND gate 173 changes to low logical level, and the output of the next NAND gate 174 changes to high logical level if the other input of the gate 174 is set to high logical level (the enable input).

This high logical level from the NAND gate 174 is transmitted back to the driver circuit 140. This, in turn, activates the transistor 142. Activation of the transistor 142 turns off the driver transistor 143. Consequently, current no longer goes through the path from the inductor 128 to the current feedback circuit 160. Instead, this current goes out to the output 130.

If the inductor 128 has zero current, negative voltage at the output of the inductor (this condition is called "swing back"), the diode 193 is forward biased, and this allows the capacitor 153 to discharge.

The protection circuit 102 in this example is configured to have several stages and in the first stage the amplifier 106 may be an LM2903 comparator that is configured as a non-inverting amplifier in one example. Vshunt (FIG. 1), which is the voltage at the non-inverting input of first operational amplifier 106 and which is connected to the current sensing shunt resistor 161 of the DC/DC converter, with the current passing through shunt resistor 161 also passing through the driver transistor 143. This first stage amplifies the voltage of the shunt to about 11 times. Other amplifications are possible.

The second stage of the protection circuit 102 in this example is the comparator 108. When the amplified Vshunt output of the first stage of protection circuit 102 crosses the threshold of 2.5V reference voltage Vref appearing at the non-inverting input of comparator 108, the output of the second stage turns to 0V and is maintained at 5V otherwise. Other values are possible.

The third stage of the protection circuit 102 is an S-R latch made by two fast switching NAND gates (NAND gates 109 and 110). When the output of comparator 108 turns to 0V the latch is reset causing the outputs (Q and $\overline{Q}$) to switch logical states. $\overline{Q}$ is also referred to as "Q negative" herein.

Q is normally in high state while $\overline{Q}$ is in low state. When an over current condition is detected, Q turns to low state and $\overline{Q}$ turns to high. Q is connected to the transistor 190 (which in one example is a NMOS that activates/deactivates the "swing back" detection). When Q is in high state, the transistor 190 is closed and the "swing-back" detection is activated thus the DC/DC converter 100 operates normally. When Q is low the transistor 190 opens thereby deactivating the "swing back" detection. This effectively cuts the frequency of operation of the circuit of FIG. 2 to a minimum. Thus, this forces the driver circuit 140 to remain off for as long as the voltage at the RC network (capacitor 153 and resistor 152) of the time off circuit 150 is above the threshold (e.g., 2.5 volts).

$\overline{Q}$ is connected to a transistor 197 (e.g., a digital NPN), which can reset the latch of channel memory 170, which in turn will turn off the driver transistor 143. This effectively limits the maximum current that can run through the transistor 143 and the inductor 128. Finally and when the time-out comparator of the DC/DC converter circuit changes to 0V, the latch in the channel memory 170 is set again and everything is ready for the next cycle.

Eventually, the time out circuit 150 changes to have a zero output. This sets the latch in the memory circuit 170 and a new cycle of operation is initiated.

Finally and when the output of the time-off comparator 151 changes to 0V, the latch (NAND gate 110) in the protection circuit 102 is set again and all components of the DC-DC converter 100 are ready for the next cycle.

Figure 3:
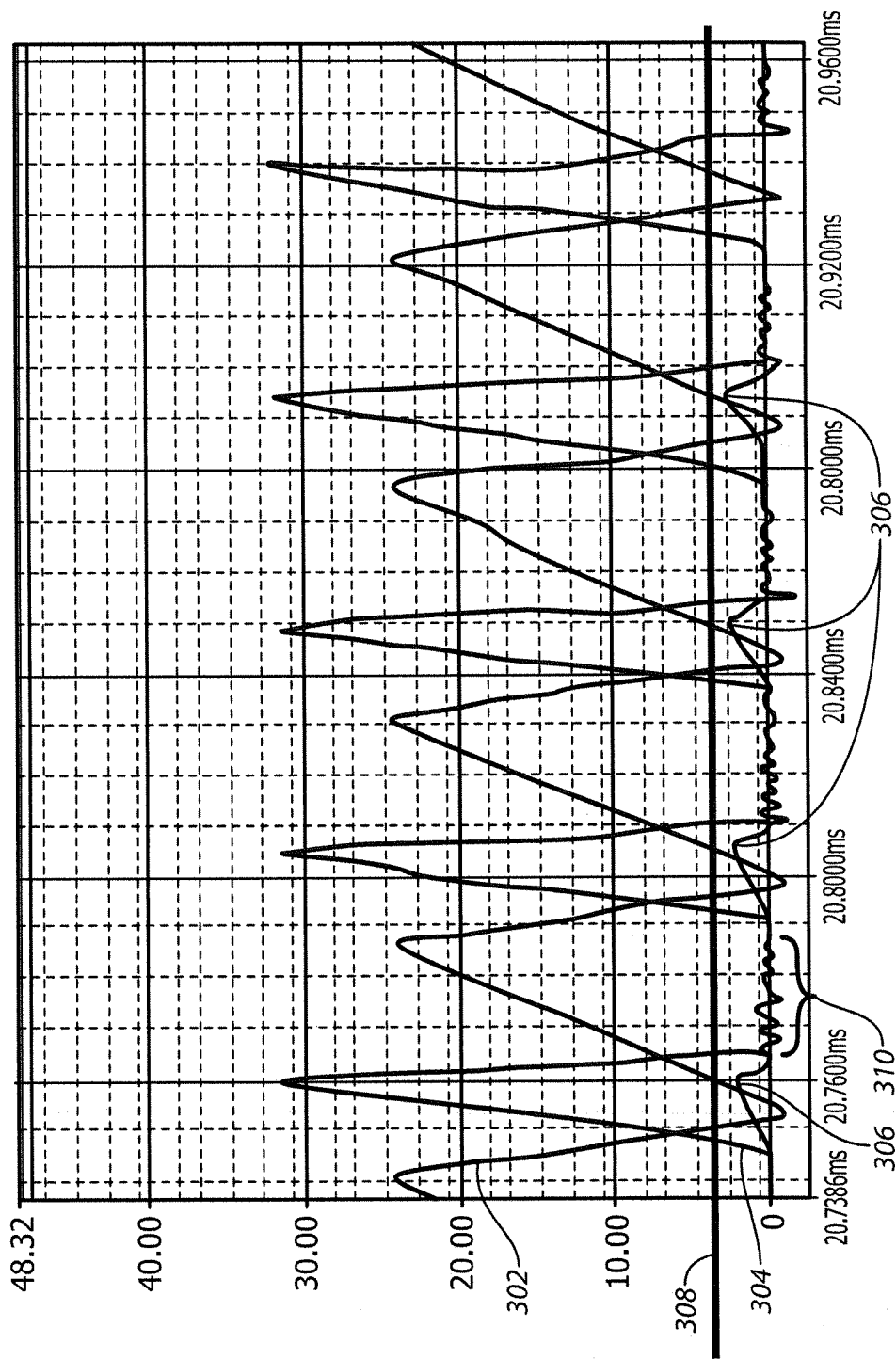
FIG. 3 comprises a graph show aspects of the operation of FIG. 1 and FIG. 2 according to various embodiments of the present invention.

Referring now to FIG. 3, examples of applying the present approaches are described. The example of FIG. 3 utilizes two circuits (i.e., channels) with each channel having a circuit of FIG. 2. A first current 302 (from the inductor 128) of the first channel is the proper behavior of a non defective inductor. However, the second inductor is defective and produces the current waveform 304. This is limited by the comparison of the waveform 306 against the threshold 308 because of the operation of the protection circuit 102. If no protection circuit 102 existed, the current waveform 304 would present an over current and the transistor 143 would become damaged or destroyed. A waveform 306 shows the output of non negative amplifier 106. The waveform 310 is part of the waveform 304 and represents the time when the transistor remains off, even though; the current in the defective coil falls to zero Amperes.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. An apparatus that is configured to prevent current overload at a transistor that is used in a DC-DC converter circuit, the apparatus comprising:
a protection circuit that determines when the current flowing through the transistor exceeds a predetermined threshold and when the current exceeds the predetermined threshold, the protection circuit configured to deactivate the transistor, the deactivating of the transistor being effective to significantly reduce one or more of the frequency of operation and current of the DC-DC converter circuit, the deactivating of the transistor limiting the current that flows through the transistor, the limiting of the current being effective to prevent damage to the transistor in an over-current condition, the protection circuit comprising an amplifier which amplifies a value corresponding to current in the transistor, a comparator having a first input coupled to an output of the amplifier and a second input coupled to a predetermined reference voltage, and a latch having a first input coupled to an output of the comparator and a second input;
a time-off circuit having an RC network with at least one capacitor and at least one resistor parallel connected to each other, a comparator having a first input coupled to the RC network, a second input coupled to a predetermined reference voltage and an output; and a channel memory latch circuit having a first input coupled to the output of the comparator of the time-off circuit, a second input coupled to an output of the latch of the protection circuit, and an output coupled to a control terminal of the transistor such that the transistor is maintained in a deactivated state by the channel memory latch circuit, the output of the channel memory latch further coupled to the time-off circuit for charging the at least one capacitor of the RC network and allowing the at least one capacitor of the RC network to discharge, the transistor is maintained in the deactivated state by the channel memory latch until the time-off circuit sets the channel memory latch and the latch of the protection circuit a period of time following deactivation of the transistor, the period of time being based on an RC delay corresponding to the RC network, the transistor being deactivated being additionally effective to prevent damage to the transistor from an over current condition.

2. The apparatus of claim 1, wherein the DC-DC converter drives a device on a vehicle.

3. The apparatus of claim 1, wherein the output of the channel memory latch indicates a fault condition and is sent to a controller.

4. The apparatus of claim 1, wherein the over current condition is caused by a defective inductor in the DC-DC converter circuit.

5. The apparatus of claim 1, wherein deactivation of the transistor is effective to place the second input of the channel memory latch in a logic state to allow for the time-off circuit to subsequently set the channel memory latch.

6. The apparatus of claim 1, further comprising a sense resistor coupled between the transistor and a reference, a node between the sense resistor and the transistor being coupled to an input of the amplifier of the protection circuit.

7. The apparatus of claim 6, further comprising a current feedback circuit comprising an amplifier circuit having an input coupled to the node between the sense resistor and the transistor, a second input and an output coupled to the second input of the channel memory latch circuit.

8. The apparatus of claim 7, further comprising a third transistor having a control terminal coupled to the output of the latch of the protection circuit, a first conduction terminal coupled to a reference voltage and a second conduction terminal coupled to the second input of the channel memory latch.

9. The apparatus of claim 1, wherein the DC-DC circuit comprises an input circuit having a battery and an output circuit including a load, and the apparatus further comprises a second transistor coupled between the input circuit and the output circuit and having a control terminal coupled to a second output of the latch of the protection circuit, the second transistor being deactivated by the protection circuit during a time when the transistor is deactivated, the second transistor being deactivated serving to allow the at least one capacitor of the RC network of the time off circuit to discharge.

10. The apparatus of claim 1, wherein each of the latch of the protection circuit and the channel memory latch comprises an S-R latch.

11. An over-current control circuit for a drive transistor of a DC-DC converter circuit, the over-current control circuit comprising:
  a sense resistor coupled in series between the drive transistor and a reference;
  a current feedback circuit comprising a comparator having an input coupled to the sense resistor and an output;
  a channel memory latch having a first input coupled to the output of the comparator of the current feedback circuitry, a second input and an output, the output of the channel memory latch coupled to a control terminal of the drive transistor;
  a protection circuit comprising a comparator having a first input coupled to the sense resistor, a second input coupled to a reference voltage and an output, and a latch circuit having a first input coupled to the output of the comparator, a second input and an output coupled to the first input of the channel memory latch; and
  a time off circuit comprising an RC circuit and a comparator having a first input coupled to the RC circuit, the RC circuit comprising at least one capacitor and at least one resistor coupled to each other, a second input coupled to the reference voltage and an output,
  wherein the current feedback circuit detects current in the drive transistor exceeding a predetermined value and resets the channel memory latch which deactivates the drive transistor, the drive transistor being deactivated for a predetermined period of time following the current feedback circuit detecting the current in the drive transistor exceeding the predetermined value, the predetermined period of time being based upon a discharge time of the RC circuit, and the output of the channel memory latch is coupled to the RC circuit for charging the at least one capacitor of the RC circuit when the drive transistor is activated.

12. The over-current control circuit of claim 11, further comprising a second transistor coupled between the time off circuit and the DC-DC converter circuit, the transistor having a control electrode coupled to the output of the latch of the protection circuit, the RC circuit discharging during a time when the latch of the protection circuit is reset and the second transistor is deactivated thereby.

13. The over-current control circuit of claim 12, wherein the protection circuit detects the current of the drive transistor exceeding the predetermined value and resets the latch of the protection circuit in response, effectively deactivating the second transistor.

14. The over-current control circuit of claim 11, wherein the output of the comparator of the time off circuit is coupled to the second input of the channel memory latch for setting same, the time off circuit setting the channel memory latch the predetermined period of time following the protection circuit detecting the current of the drive transistor exceeding the predetermined value, the channel memory latch being set activates the drive transistor.

* * * * *